US007757225B2

(12) United States Patent
Copeland et al.

(10) Patent No.: US 7,757,225 B2
(45) Date of Patent: Jul. 13, 2010

(54) LINKTIME RECOGNITION OF ALTERNATIVE IMPLEMENTATIONS OF PROGRAMMED FUNCTIONALITY

(75) Inventors: Jeffrey L. Copeland, Bellevue, WA (US); Jason D. Zions, Bellevue, WA (US); Donn S. Terry, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1107 days.

(21) Appl. No.: 09/897,540

(22) Filed: Jun. 29, 2001

(65) Prior Publication Data

US 2003/0046673 A1 Mar. 6, 2003

(51) Int. Cl.
G06F 9/44 (2006.01)
G06F 9/45 (2006.01)

(52) U.S. Cl. .............. 717/163; 717/152; 717/154; 707/705

(58) Field of Classification Search ......... 717/106–108, 717/114–119, 136–137, 140, 141, 162–166
See application file for complete search history.

(56) References Cited

U.S. PATENT DOCUMENTS

| | | | | |
|---|---|---|---|---|
| 4,931,928 A | * | 6/1990 | Greenfeld | 717/131 |
| 5,179,703 A | * | 1/1993 | Evans | 717/122 |
| 5,210,876 A | * | 5/1993 | Uchida | 717/139 |
| 5,230,049 A | * | 7/1993 | Chang et al. | 717/143 |
| 5,504,885 A | * | 4/1996 | Alashqur | 717/141 |
| 5,560,010 A | * | 9/1996 | Albert | 717/108 |
| 6,108,660 A | * | 8/2000 | Ikeda et al. | 707/101 |
| 6,260,187 B1 | * | 7/2001 | Cirne | 717/110 |
| 6,263,493 B1 | * | 7/2001 | Ehrman | 717/114 |
| 6,360,360 B1 | * | 3/2002 | Bates et al. | 717/160 |
| 6,374,238 B1 | * | 4/2002 | Iwata et al. | 707/3 |
| 6,374,239 B1 | * | 4/2002 | Anderson et al. | 707/4 |
| 6,378,126 B2 | * | 4/2002 | Tang | 717/143 |
| 6,480,833 B2 | * | 11/2002 | Kaneko et al. | 707/2 |
| 6,487,713 B1 | * | 11/2002 | Cohen et al. | 717/105 |
| 6,487,714 B1 | * | 11/2002 | Azagury et al. | 717/116 |
| 6,496,976 B1 | * | 12/2002 | Smith et al. | 717/145 |
| 6,654,954 B1 | * | 11/2003 | Hicks | 717/162 |
| 6,658,659 B2 | * | 12/2003 | Hiller et al. | 717/170 |
| 6,665,735 B1 | * | 12/2003 | Tanaka et al. | 719/331 |
| 6,704,926 B1 | * | 3/2004 | Blandy et al. | 717/148 |
| 6,718,546 B1 | * | 4/2004 | Johnson | 717/169 |
| 6,813,762 B1 | * | 11/2004 | Plaxton | 717/148 |
| 6,859,932 B1 | * | 2/2005 | Shann | 717/162 |

OTHER PUBLICATIONS

"Turbo C++, User's Guide", Borland International Inc.; 1992; pp. 1-9, 96-103, 331, 369-398, 501-522, 586.*

(Continued)

*Primary Examiner*—Lewis A Bullock, Jr.
*Assistant Examiner*—Paul Mills
(74) *Attorney, Agent, or Firm*—Lee & Hayes, PLLC (57) ABSTRACT

A method and apparatus are disclosed for optimizing the runtime behavior of database or other applications by allowing selection of alternative code segments during linking of pre-compiled object modules. A macro-preprocessor inserts a declaration for a global variable in the source code in response to an occurrence of a command of interest. The linker selects object modules for executing other commands based on the presence or absence of the declaration for the global variable in the preprocessed source code. The method and apparatus are useful in implementing programming language statements including non-procedural programming languages such as the Embedded Structured Query Language (ESQL).

16 Claims, 8 Drawing Sheets

OTHER PUBLICATIONS

"Extraction and Hierarchical Reporting of Relationships"; IBM Technical Disclosure Bulletin (NN911084), vol. 34, Issue 5, 1991; pp. 84-89.*

Srivastava et al., "A Practical System for Intermodule Code Optimization at Link-Time", Digital Western Research Laboratory, Palo Alot, California, Research Report 92/6, Dec. 1992, pp. 1-33.*

Srivastava et al., "Link-Time Optimization of Address Calculation on a 64-bit Architecture", Digital Western Research Laboratory, Palo Alot, California, Research Report 94/1, Feb. 1994, pp. 1-25.*

Design and Implementation of a Prolog-to-C Compiler Anatholy F. Dedkov and Douglas J. Eadline, Paralogic, Inc., 115 Research Dr. Bethlehem, PA 18015 USA Copyright 1995, Paralogic, Inc., All Rights Reserved.*

Generating Call-Level Interfaces for Advanced Database Application Programming U. Nink, T Härder, N. Ritter Proceedings of the 25th VLDB Conference, Edinburgh, Scotland, 1999.*

Evolution of Object Behavior Using Context Relations Linda M. Seiter, Jens Palsberg, Karl J. Lieberherr ACM SIGSOFT Software Engineering Notes vol. 21, Issue 6 (Nov. 1996).*

"*Microsoft ODBC 3.0 Programmer's Reference*, vol. 2", 1997, pp. 429-1026.

"*Microsoft ODBC 2.0 Programmer's Reference and SDK Guide*", 1994, pp. 189-422.

Date, C.J., et al., "*A Guide to the SQL Standard*", Fourth Edition, Addison-Wesley, 1997, pp. 3-511.

"*Programmer's Guide to the Oracle Pro*C/C++, Procompiler*", Feb. 1996.

* cited by examiner

LINKTIME RECOGNITION OF ALTERNATIVE IMPLEMENTATIONS OF PROGRAMMED FUNCTIONALITY

TECHNICAL FIELD OF THE INVENTION

This invention relates generally to generating an efficient executable corresponding to a program written in a higher-level computer programming language, and more particularly to use indicators that change the executable code to take into account the context in implementing a particular command.

BACKGROUND OF THE INVENTION

The advent of databases and e-commerce requires the ability to request services from a variety of databases without knowing the exact implementation of the database or of the statements used to request the services. These request statements are made in a non-procedural programming language that does not provide an explicit implementation. Instead, the developers of particular databases or non-procedural programming language statements provide proprietary implementations for the statements rendered in the non-procedural language.

Structured Query Language ("SQL") is an illustrative example of a non-procedural language. SQL differs from a procedural language like FORTRAN in that it does not specify how a particular request is carried out, but instead allows the database manager to provide the relevant details. Thus, a command in SQL merely states a request and not how it is carried out.

SQL includes: a Data Development Language ("DDL") for creating databases and data structures, but not necessarily data itself; a Data Manipulation Language ("DML") facilitating database maintenance and actual operations on data; and a Data Control Language ("DCL") for specifying security requirements. Some examples of SQL commands include the DDL commands CREATE, ALTER and DROP, DML statements and functions such as INSERT, UPDATE, DELETE, SELECT, COUNT, SUM and the like, and DCL commands such as COMMIT, ROLLBACK, GRANT and REVOKE.

SQL permits interactions with a database in an atomic manner, i.e. only one user may access a unit of data, to prevent other users from changing the database between operations constituting a transaction. The code used to implement these commands and functions is the responsibility of the database developer or vendor. Of course, universal support for SQL commands ensures that any user can access and use a SQL compliant database regardless of the database vendor and particular implementation details.

SQL commands such as COMMIT and ROLLBACK are of interest in an exemplary embodiment of the invention. These SQL commands protect a database against inadvertent corruption. To this end the database itself is not affected until the COMMIT command is given. If an error occurs then a ROLLBACK command restores the state of the system to that at the conclusion of the previous COMMIT command. A transaction is terminated by either a COMMIT command or ROLLBACK command combined with allowing other users access to the data. A ROLLBACK command requires buffering of all operations following a COMMIT command to permit restoration of the state following the COMMIT command.

If the transaction fails or a user cancels a transaction, a ROLLBACK results in clearing the buffered operations and removing access restrictions to restore the database to its state prior to the initiation of the now failed transaction. On the other hand, a COMMIT command results in updating the database followed by clearing of the buffered operations.

Another SQL command, SAVEPOINT, enables restoring the system to an earlier defined state that need not be the state at the conclusion of the previous COMMIT command. Like the COMMIT command in the context of the ROLLBACK command, SAVEPOINT provides a prior state of the system for the ROLLBACK command. Unlike the COMMIT command, however, the SAVEPOINT command does not require changes to the database. Instead SAVEPOINT enables specification of a defined state for system restoration. In some embodiments the SAVEPOINT command specifies multiple earlier states distinguished by their respective identifiers. If desired, the system can be restored to one of the specified earlier states by executing a ROLLBACK to the specified state. If a COMMIT command is given then all buffered operations are cleared along with the states specified by the SAVEPOINT command.

Implementing the SAVEPOINT or ROLLBACK commands requires considerable overhead since other commands must therefore provide buffering. On the other hand, it is not necessary to support buffering if the SAVEPOINT or ROLLBACK commands are not used. A typical application includes SQL statements in several files and a compiler compiles only one file at a time. Thus, it is not possible to decide when compiling a particular file whether buffering-related code is needed due to a statement in another file.

SQL applications written using SQL statements and functions can be combined with source code in a programming language such as C++ in Embedded SQL ("ESQL"). An ESQL application can include several source code files. The source files for an ESQL application are preprocessed by a macro-preprocessor. Typically, the macro-preprocessor generates code for the various embedded SQL statements or introduces additional statements followed by a compiler compiling the output of the macro-preprocessor. Compiling a source file generates an object module corresponding to the source file. The linker links object modules to generate the executable program.

Compiling a source code file includes several operations. A compiler parses the source code, carries out several checks to ensure conformity with the programming language specifications and then translates the parsed code to generate a lower level code such as machine code for execution on a computer. In some instances, the code is assembly or byte code that needs further translation for actual execution on a particular computer. A compiler allocates memory for each variable to properly translate source code to generate executable code. The compiler allocates memory for each variable in accordance with a "type" specification for the variable in question.

Type information is specified in a "declaration" statement. Each variable is assigned a particular type. The compiler enters the type information for each variable into a symbol table associated with an object module. When several object modules in the same executable share a variable it is important to ensure that only one module actually allocates memory for the variable. The compiler allocates memory in response to a "definition" statement for a particular variable. However, the declaration and/or definition statements are allowed to be implicit in many programming languages.

The "C" programming language permits an "extern" declaration in a source file that tells the compiler that memory for the specified variable is allocated in another file. Consequently, a C compiler only creates a variable entry in the symbol table that serves as a place holder for the variable but leaves the actual memory allocation to another file. The variable merely points to its entry in the symbol table and is redirected to the actual memory allocation following identification of the intended memory location. Thus, there are several declarations for a variable but there can be only one definition. No value can be assigned to a variable unless the variable is defined because there is no memory allocated to store it.

Following compilation, a linker links the resultant object files to generate the executable for the application. The linking may be static or dynamic. In static linking the object files identified by the linker for the resolution of all variables are copied to generate an executable file. In contrast, dynamic linking allows fetching an object file at either load time or at runtime. Consequently, the same object module is used by several applications. As is evident, typically dynamic linking results in lower memory requirements and smaller executable sizes. Furthermore, a programmer can modify and recompile a dynamically-linked module independent of another module, thus making software maintenance easier and less expensive.

Declaring a variable with an "extern" keyword requires the linker to identify the actual memory allocated for the variable in other object modules. To this end the linker searches symbol tables associated with object modules or libraries for a module providing a definition for the variable in question. This process is termed resolving the variable. Proper resolution of a variable is required before it can actually be used in an executable file.

In software development projects a software application is refined over the life of the project. Through the development process, concepts concerning various problems and solutions are often revised, and the functions and features of the final software application are often quite different from those at the beginning of the project. Support for additional features supporting execution of other statements in a non-procedural language statement reduces the execution efficiency of programs that do not use these additional features. On the other hand, adding distinct commands to provide the additional features results in complex programming languages with many statements differing only in the context in which they should be used. For example, if there is at least one command that requires buffering prior changes to a database in an SQL-based application, then implementations of other commands affecting the database need to support buffering. On the other hand, if no command requiring buffering is used in an application then the program overhead for buffering unnecessarily slows down the application.

As a programming language evolves to develop specific commands for a particular context, developers have to learn different commands for accomplishing similar tasks rather than preserving their existing familiarity with the programming tool. Similar sounding commands that differ in subtle but significant details increase the risk that a programmer inadvertently uses the less effective command. Such errors are difficult to identify since some may only sporadically result in bugs. Therefore, it is desirable to have a system and method for providing contextually efficient implementations for a programming language command that can be invoked automatically without requiring the programmer to use different commands to invoke optimized implementations for different contexts.

SUMMARY OF THE INVENTION

In view of the foregoing, the present invention provides a method and system for selecting one of several implementations of a higher level programming language statement in response to the occurrence or non-occurrence of another statement in a computer program. The invention enables transparent selection of contextually efficient code. Thus, users and developers need not use different higher language statements to invoke a context-specific implementation.

A macro-preprocessor enables choosing a context sensitive implementation for a higher language statement. The macro-preprocessor introduces a first global variable declaration in response to identifying a specific context. In an embodiment, the specific context is defined by the presence of one or more specified statements in a source file processed by the macro-preprocessor. In an embodiment of the invention, the first global variable enables setting a desired value for a second variable by introducing the second variable in a first object module supplying the definition for the first global variable. This strategy provides for a level of indirection to include the first object module in response to identifying a specified context. In the event the linker does not include the first object module, an alternative definition for the second variable is provided in a second object module.

In an embodiment of the invention a linker library object module is loaded using a wrapper based upon the first global variable. Moreover, an embodiment of the invention enables conditionally executing a first program sequence in response to the second variable value specifying a context of interest.

For instance, the need to support the underlying implementation of a RESTORE command may require a DELETE command to include buffering deleted data. However, if no RESTORE command is used in a program then there is no need to incur the overhead of buffering extensive information in the implementation of the DELETE command.

It should be noted that the invention, while illustrated with SQL, is not limited to SQL or even non-procedural languages, but instead includes higher-level languages and scripts. Such higher-level languages and scripts can benefit from using different binary, byte-code or macro implementations for the same command depending on a particular context.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
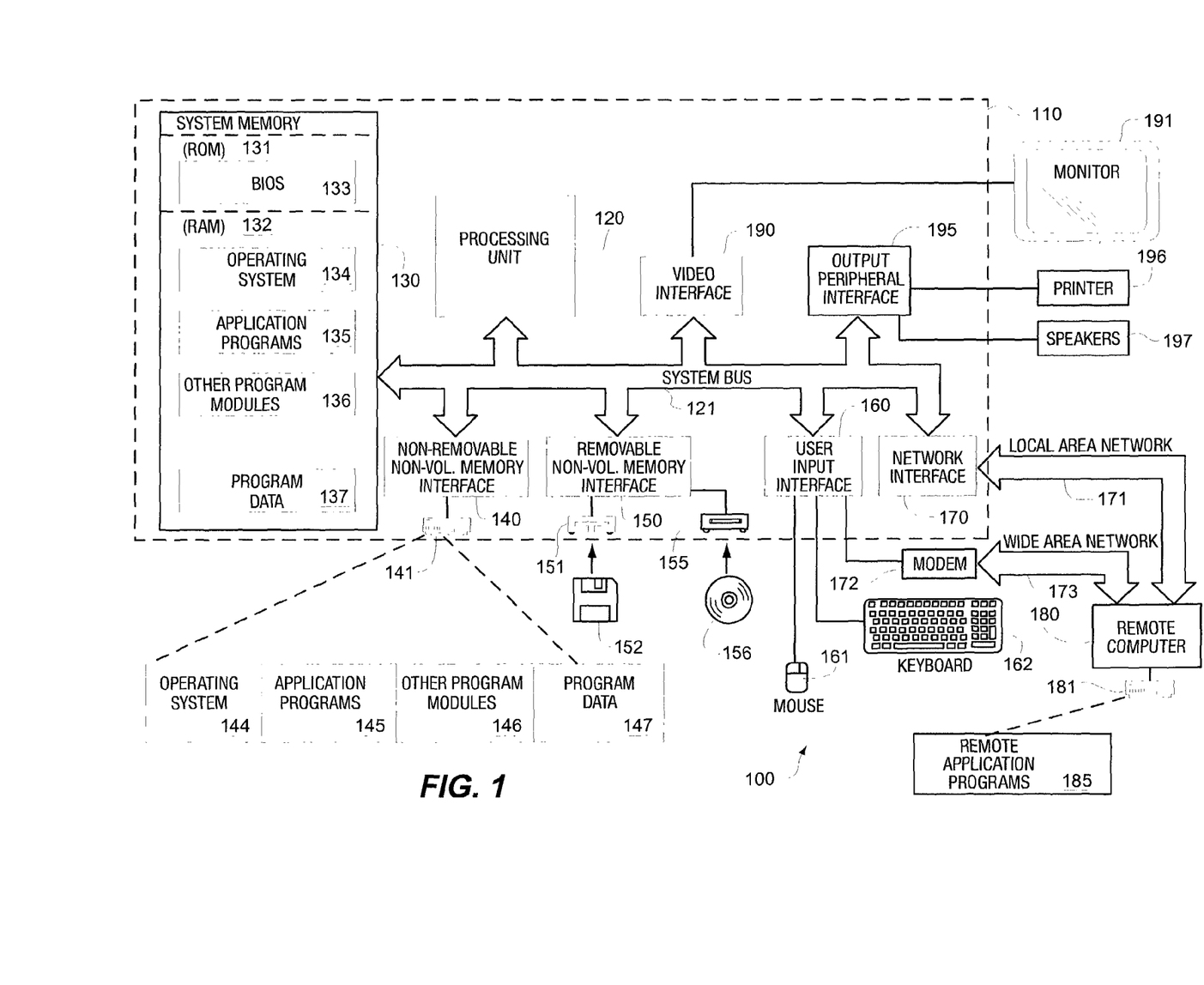
FIG. 1 is a block diagram generally illustrating an exemplary computing environment in which databases and other software structures are implemented along with higher-level languages being used to describe desired services, including services pertaining to the database.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
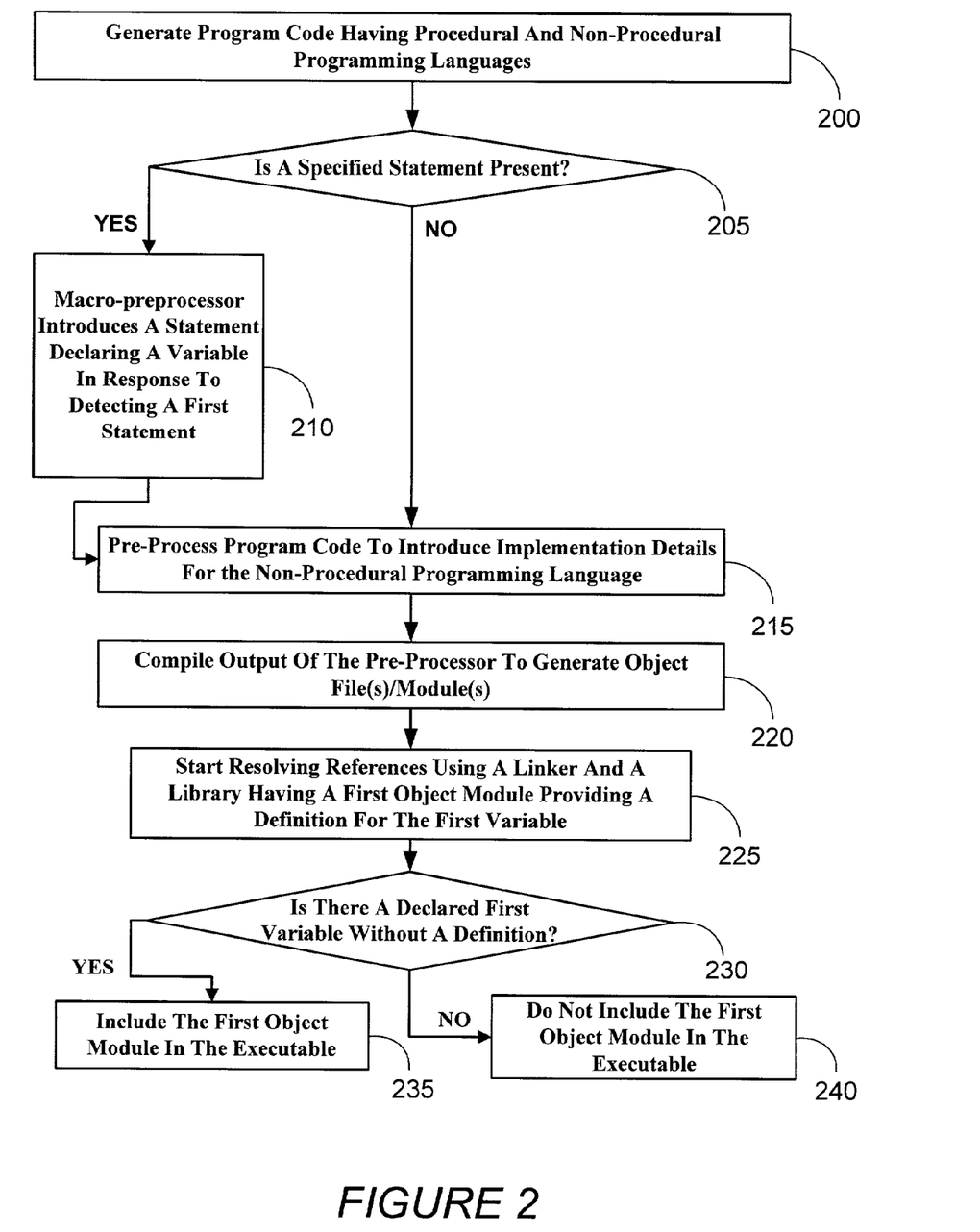
FIG. 2 is a flowchart summarizing an exemplary set of steps of preprocessing, compiling, linking and executing a computer program in a computing environment.

An embodiment of the present invention illustrated in FIG. 2 enables a software developer to efficiently develop applications suitable for particular applications, including those for accessing, managing and otherwise utilizing databases. During step 200 a programmer or developer generates program code comprising procedural and non-procedural programming languages. Examples of suitable programming languages include ESQL that allows embedding SQL commands in programs written in the C programming language. The program code is pre-processed by a macro-preprocessor during step 205. During step 205 the macro-preprocessor examines the source code for an occurrence of one or more specified statements. During step 210 any one of the specified statements is detected. Then the macro-preprocessor introduces a declaration for a first variable that is explicitly not defined. In the case of ESQL the first variable is declared using the "extern" key word to indicate to a compiler that no storage should be allocated since it would be allocated in another module. The macro-preprocessor also inserts statements that are in the form of function calls compliant with the Open Data Base Connectivity ("ODBC") standard during step 215, but may include other mechanisms. Step 215 provides the proprietary implementations for a particular database since, as explained earlier, the actual implementation of a non-procedural language statement is not specified.

During step 220 a compiler converts the macro-preprocessor output to low-level instructions. Next, during step 225 a linker starts to resolve references using a library having a first object module that includes a definition for the first variable introduced by the macro-preprocessor at step 210. If the linker detects during step 230 that the variable introduced by the macro-preprocessor has to be resolved then control transfers to step 235. During step 235 the linker links the first object module having a definition for the declared variable introduced by the macro-preprocessor from the appropriate library. On the other hand, during step 230 if the linker does not detect the variable introduced by the macro-preprocessor then control is transferred to step 240. During step 240 the linker does not link in the first object module since the first variable does not need to be resolved. As is readily apparent, the presence or absence of the first module in the executable is strictly dependent on the presence or absence of the specified statement tested in step 205.

Figure 3:
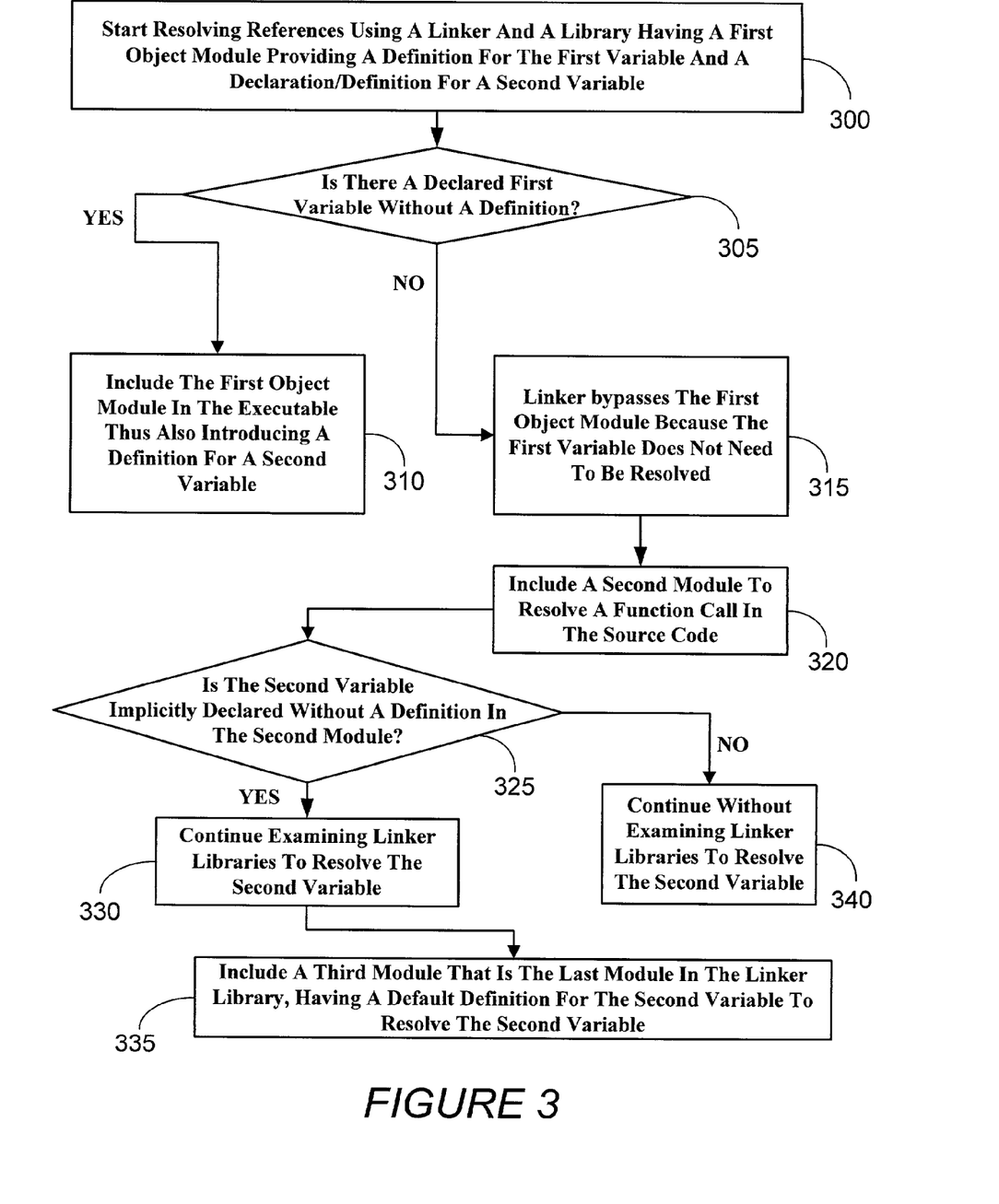
FIG. 3 is a flowchart summarizing exemplary steps of an embodiment that introduces statements in the program code to generate an efficient runtime executable in accordance with the invention.

FIG. 3 illustrates an embodiment of the invention enabling setting the value of a variable to a non-default value in response to detecting a specified statement. Steps 300 and 305 of FIG. 3 correspond to steps 225 and 230 respectively of FIG. 2. If the declaration introduced by the macro-preprocessor does not have a definition, then control passes from step 305 to step 310. During step 310 the linker includes a first object module to resolve the first variable. Furthermore, the first object module introduces a non-default value for a second variable.

If the linker does not encounter a declaration for the first variable, i.e., the macro-preprocessor did not detect the specified statement, then there is no first variable to resolve and control passes to step 315 from step 305. During step 315, the linker bypasses the first module because the first variable does not have to be resolved. During step 320 the linker includes a second object module to carry out a command, such as a DELETE command, in the source code. If the second object module includes a declaration for the second variable without a definition, as determined in step 325, then the control shifts to step 330.

The determination of the second variable declaration during step 325 results from the second variable's presence in a symbol table for the second object module and the absence of a corresponding memory allocation. During step 330 the linker continues to scan the linker libraries in an effort to resolve the second variable. Step 335 includes inclusion of a third module by the linker to resolve the second variable. The third object module, that is also the last module in the linker library, provides a definition setting a default value, e.g., 0, for the second variable. This value is in contrast with the non-default value set in the first object module. The linker did not include the first module since the first object module was encountered prior to the entry of the unresolved reference to the second variable included during step 325.

It should be noted that while the linker encounters the first module prior to the second module, the third object module is encountered after the second module. On the other hand, during step 325 if the linker does not detect a second variable to be resolved, then control passes to step 340. During step 340 the linker continues without resolving the second variable or including the third object module.

Figure 4:
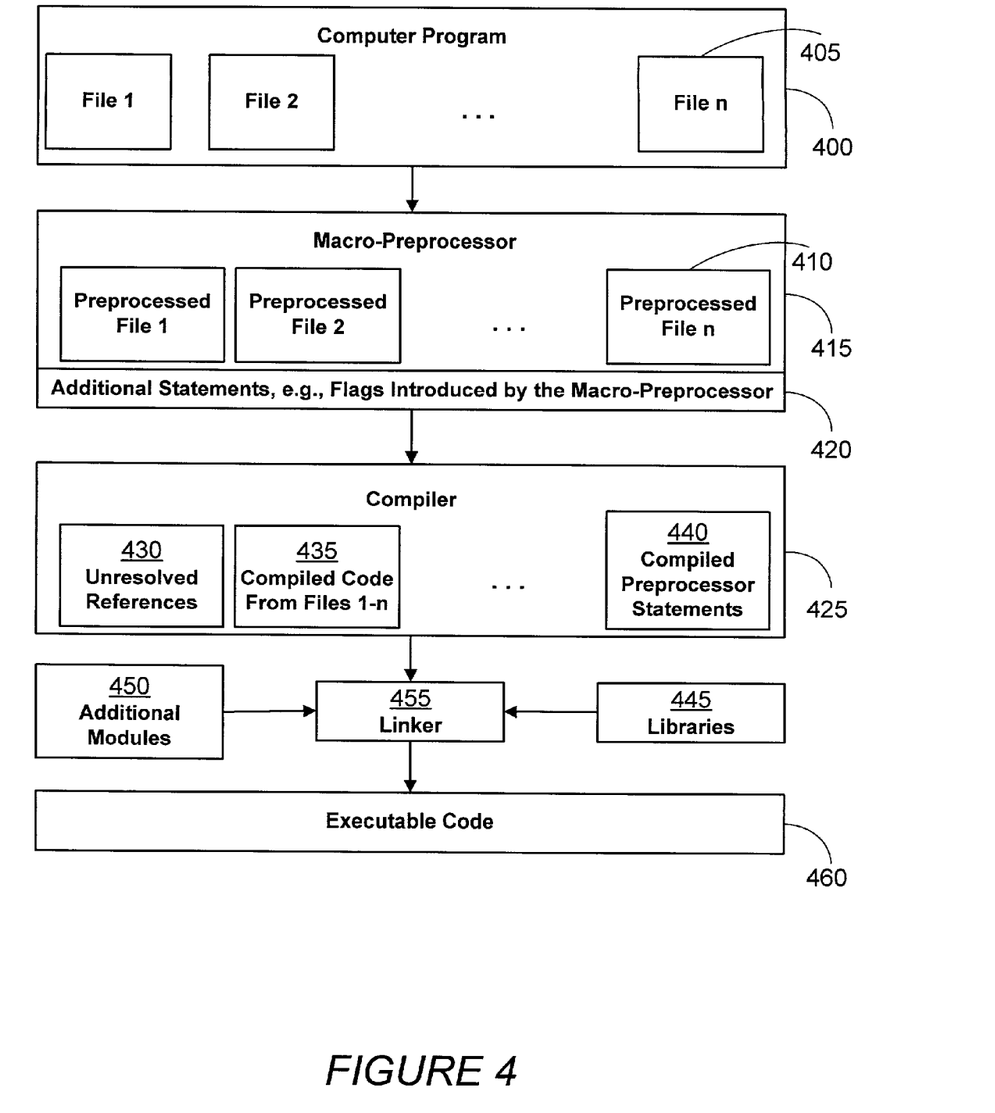
FIG. 4 is a flow diagram illustratively depicting compilation of a program using a preprocessor, a compiler and a linker.

A software application includes one or more object modules that often correspond to source code files as is shown in FIG. 4. A software program 400 has one or more source files 405 corresponding to the object modules. Some of the source files include commands in a higher-level language, such as function calls or even instructions in scripted language. Code corresponding to each of these commands is substituted to actually implement the instruction. Thus, a macro-preprocessor 415 converts the computer program 400 having files 405 in FIG. 4 to yield preprocessed program code comprising files 410 and possibly additional statements 420 in a compilable language.

An example of such a system is the SQL language and its extension in ESQL. SQL ensures that some standardized tasks can be performed without locking users into particular implementations. ESQL enables embedding SQL statements in one or more higher-level languages. A macro-preprocessor replaces the embedded SQL statements by implementation-specific code compiled along with the higher-level language statements. Thus, an exemplary ESQL processor works by reading C language statements with interspersed Structured Query Language (SQL) statements. The SQL statements are converted into Open Database Connectivity (ODBC) compliant calls. The resulting source code is compiled and linked. For illustration purposes, FIG. 4 shows the result of compiling the preprocessed program code 420 by compiler 425 to generate object code. This object code includes, in the various object modules contained therein, unresolved references 430, compiled code 435 corresponding to the files 410 and the compiled macro-preprocessor introduced statements 440.

This object code is subsequently, acted upon by a linker 455. Linker 455 supplies additional object modules to resolve unresolved references 430 by providing object code from libraries 445 and additional object files 450 that are included by the user. The linker 455 also ensures that the different object modules have the proper offsets relative to each other to allow execution of a single executable 460. The executable 460 is executed in an environment similar to computing environment 100.

In an embodiment of the present invention, a first statement, such as SAVEPOINT, in a program requires a different implementation for a second statement such as DELETE. Two possible implementations for the second statement independently designate performance characteristics at runtime. These implementations are provided in different object modules corresponding to the same instruction or statement. Thus, it is desirable that the code that actually implements the additional program instructions including the second statement should be sensitive to the occurrence or non-occurrence of the first statement.

Instead of requiring developers to examine all source code files to discover an occurrence of the first statement, a macro-preprocessor discovers an occurrence of the first statement. The macro-preprocessor is designed to respond to a context defined by the occurrence or non-occurrence of one or more statements of interest. Furthermore, modified linker libraries include object modules for resolving variables introduced by the macro-preprocessor. Additional modifications to the linker libraries allow object modules in the linker libraries to use one or more of the global variables representing a context while selecting code for execution at runtime.

Exemplary embodiments in accordance with the invention are described herein below without intending to limit the invention to these embodiments. In an embodiment of the invention the fact that a variable that is declared but not defined is set to default value, e.g., 0, is used to select code for execution. Thus, if the variable is given a non-default value upon encountering a statement of interest then code relevant to the statement of interest is executed. Selecting code based on the value of the variable results in faster code although without reduction in the footprint of the executable. The following pseudo-code illustrates such a variable to conditionally execute a code segment:

IF (_FIRST_STATEMENT_DETECTED==0) THEN
{Execute efficient code for implementing second statement because the first statement is not being used}
ELSE
{Execute the code with the overhead for implementing the second statement because the first statement was detected}
END The variable _FIRST_STATEMENT_DETECTED is declared and defined in a statement introduced by the macro-preprocessor if the macro-preprocessor encounters the first statement in any of the program files.

In the context of ESQL the implementation of the SQL statement, SAVEPOINT, provides an illustration of a global variable to flag a particular context. SAVEPOINT allows restoration of an earlier state, i.e., undoing a set of operations on a database. Therefore, if SAVEPOINT is used then the various state defining parameters need to be saved as other commands/statements are executed. Upon detecting SAVEPOINT the ESQL processor injects a declaration into the C stream of the form:

extern int_OCC_SAVEPOINT_USED;

The "extern" keyword informs the compiler that storage for _OCC_SAVEPOINT_USED is allocated in another file. Therefore, the compiler does not initialize _OCC_SAVEPOINT_USED. The linker uses two or more libraries such that the first library used by the linker contains as its first object module compiled code corresponding to the source code:

int_OCC_SAVEPOINT_USED=1;
    int_OCC_SAVEPOINT_ENABLED=1;

and the second library contains in its last object module compiled code corresponding to the source code:

int_OCC_SAVEPOINT_ENABLED=0;

In the linking process, if the macro-preprocessor injects a declaration for variable _OCC_SAVEPOINT_USED, the linker includes the first object module to provide a definition. The first object module provides a declaration and a value for _OCC_SAVEPOINT_ENABLED as illustrated. Subsequently, other object modules in the library include instructions that test variable _OCC_SAVEPOINT_ENABLED to flag whether SAVEPOINT has been used in any of the source files. If _OCC_SAVEPOINT_ENABLED is set, processing for SAVEPOINT will proceed. If _OCC_SAVEPOINT_USED is not set, the other object modules will not incur processing for SAVEPOINT.

In another embodiment of the invention, any program object module using the SAVEPOINT feature includes the declaration:

int_OCC_SAVEPOINT_NOT_USED;

A variable declaration assumes that upon first encountering the variable the compiler sets the variable to zero by default unless the contrary is indicated. However, this is not a requirement. And, multiple declarations in other object modules are harmless. The linker uses a library containing an object module having compiled code corresponding to the following code:

int_OCC_SAVEPOINT_NOT_USED=1;

The macro-preprocessor declares _OCC_SAVEPOINT_NOT_USED resulting in the linker including the library object module setting _OCC_SAVEPOINT_NOT_USED to 1 only if _OCC_SAVEPOINT_NOT_USED is not declared elsewhere in the main program. (Note carefully the logical NOT: if the variable is not used in the main program, it is set to one or TRUE.) Then any other object module in the library can test _OCC_SAVEPOINT_NOT_USED to decide if SAVEPOINT is used in any module in the program.

In another embodiment of the invention, a program object module using the SAVEPOINT feature will include a series of declarations having a global scope:

int_OCC_SAVEPOINT_USED;

The first object module in the library contains compiled code corresponding to int_OCC_SAVEPOINT_USED=1;
    int_OCC_SAVEPOINT_MODULE_1;
    int_OCC_SAVEPOINT_MODULE_2;

... and so on up to the number of separate object modules containing code dedicated for implementing SAVEPOINT. Each of the separate object modules for implementing SAVEPOINT contain a matching definition     int_OCC_SAVEPOINT_MODULE_1=1;

The first object module is included in the executable program In this way, those object modules containing code for SAVEPOINT can be included in the executable when required.

The invention uses well known rules for preprocessing, compiling and linking computer programs, particularly programs using the C or C++ programming language to improve the development of application programs. It provides a method for developing a computer program using a non-procedural programming language. The method includes declaring at least one first variable in a first source file responsive to detecting a first statement conforming to the non-procedural programming language. A macro-preprocessor examining the source code introduces a declaration statement for the first variable. A compiler compiles the first source file to generate a first object module followed by linking using at least one library. The linker includes a second object module containing a definition for the first variable to resolve the first variable. The second object module includes access to code to support implementation of the first statement. This access includes references to functions that are invoked by other statements to ensure proper execution of the first statement.

Furthermore, an additional non-procedural programming language is used to provide a third statement conforming to the additional non-procedural programming language.

Figure 5:
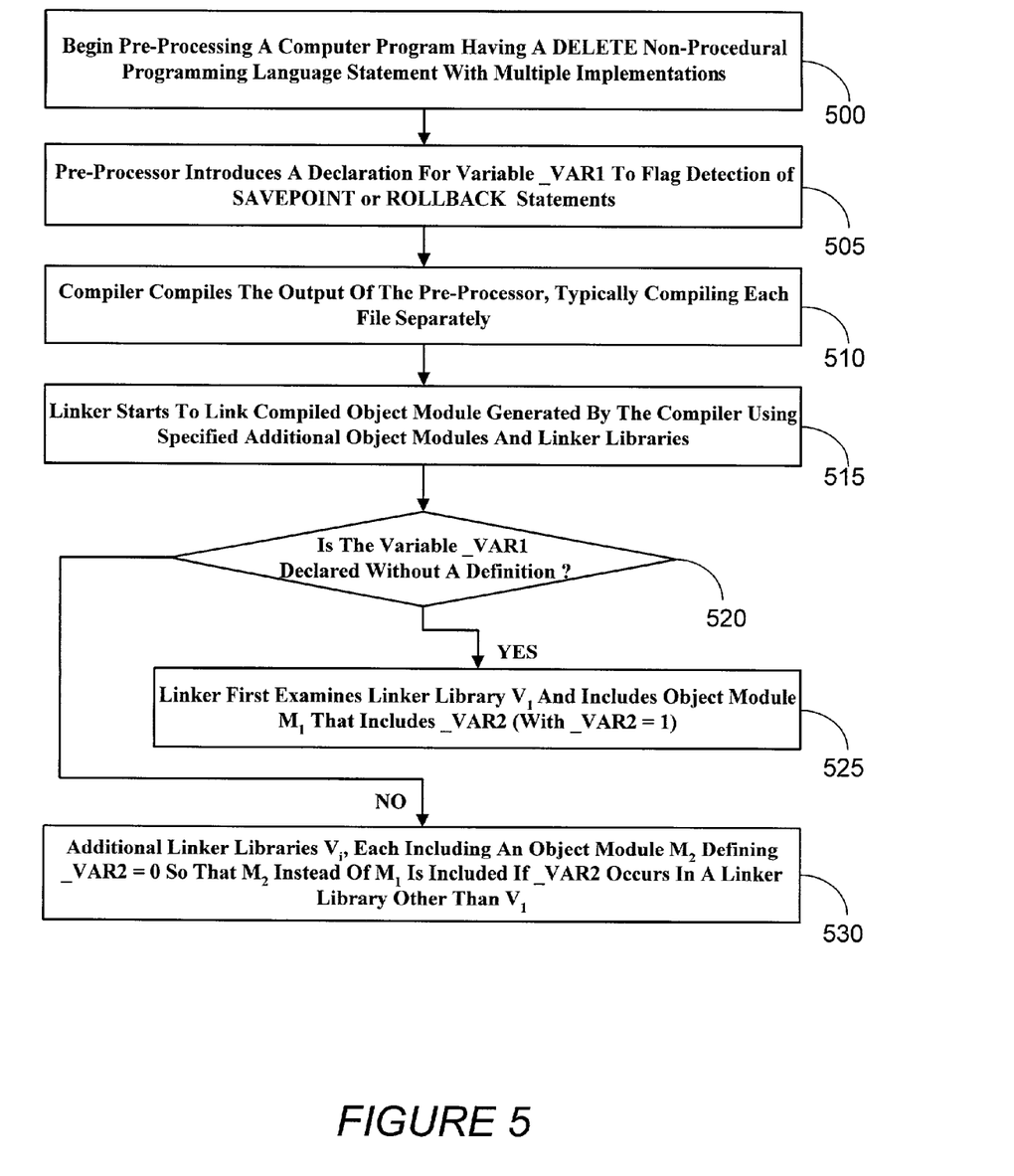
FIG. 5 is a flow chart illustrating an exemplary set of steps for introducing a global variable reflecting the context of command in an embodiment of the invention.

The flowchart in FIG. 5 describes an embodiment of the invention that enables including object modules from linker libraries to support additional overhead in the implementation of a DELETE statement. The additional overhead is required by the execution of one or more additional specified statements such as SAVEPOINT. In step 500 a computer program having the DELETE non-procedural programming language statement is pre-processed. However, the additional buffering overhead needs to be incurred only if the SAVEPOINT command or the ROLLBACK command is used in the computer program.

To flag the need for incurring an overhead the pre-processor introduces a declaration for a variable _VAR1 as being an "extern" upon encountering a ROLLBACK or SAVEPOINT statement during step 505. Declaring the variable to be "extern," in a C like programming language, informs the compiler that the variable definition is in another file external to the file being compiled. Consequently, the compiler does not initialize the variable during compilation in step 510.

Following compilation, the object files generated by the compiler during step 510 are linked in step 515 using a linker program that resolves variable references in the object files. The linker detects if _VAR1 lacks a definition during step 520. If _VAR1 lacks a definition then the linker resolves _VAR1 by examining the linker libraries for an object module having a definition for _VAR1, i.e., specifying memory for _VAR1. A value for a variable can be specified only after memory allocation for storing the variable value. During step 525 the linker encounters a first linker library $V_1$ having an object module $M_1$ that provides a definition setting _VAR1 to 1 along with a definition setting an additional global variable _VAR2 to a non-default value of 1. During step 525 inclusion of object module $M_1$ by the linker results in automatically including _VAR2 in a symbol table for the program being created by the linker. Other object modules included by the linker can include instructions to test the value of _VAR2 to detect if object module $M_1$ has been included. Notably, _VAR2 does not occur in the computer program, but is used in one or more of the additional object modules included in the linker libraries.

In the absence of an unresolved occurrence of _VAR1 in the pre-processed code, the linker does not include object module $M_1$. Instead control is transferred to step 530. During step 530, the occurrence of _VAR2 in other object modules included by the linker results in the linker including an object module $M_2$ to provide a declaration for _VAR2. The object module $M_2$ and $M_1$ can be given the same name but are not in the same linker library, $V_1$. Thus, the linker includes only one of modules $M_1$ or $M_2$. In other words, the linker includes object module $M_1$ prior to encountering object module $M_2$ if a SAVEPOINT or ROLLBACK command is encountered. Otherwise, object module $M_2$ is included, thus precluding any need to include object module $M_1$ (step 525). The executable constructed by this procedure differs in its size based on whether SAVEPOINT or ROLLBACK commands are being used.

Figure 6:
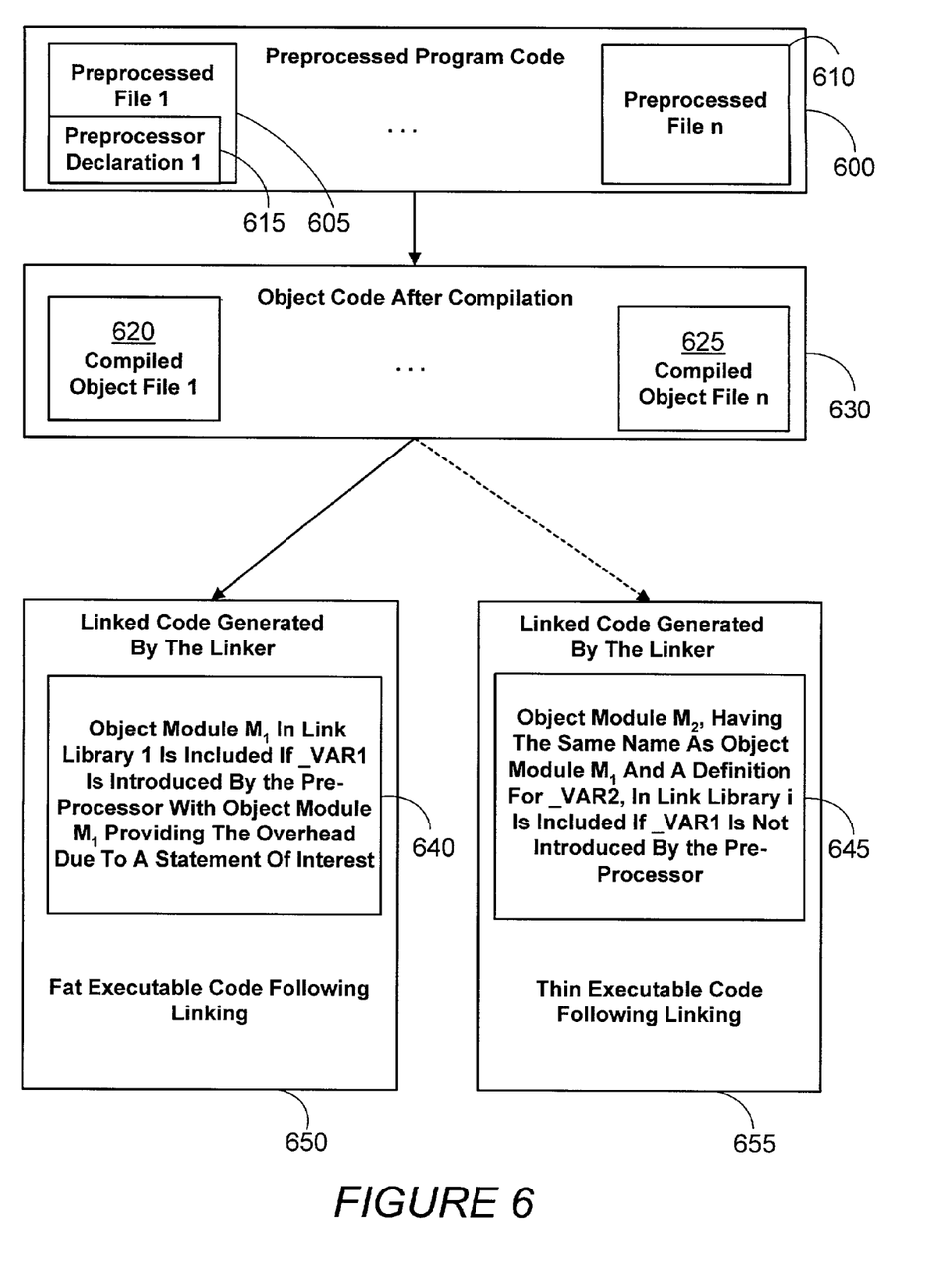
FIG. 6 is a flow diagram illustratively depicting transformation of a program from high level instructions to executable code, including transformation to the pre-processed code and subsequent incorporation of particular object modules based upon a detected context.

FIG. 6 further illustrates an embodiment in accordance with the invention. In FIG. 6 preprocessed program code 600 includes files such as file 605 and file 610 with file 605 having some statements 615 introduced by the preprocessor. Preprocessed code 600 is compiled to obtain object code 630 having object module, e.g., object module 620 and object module 625. Linker links object modules using link libraries. The linked version includes conditional on an unresolved declaration of _VAR1 object module $M_1$ 640 resulting in a fat version 650. The object module $M_1$ provides support for the extra overhead in response to the macro-preprocessor declaration 615 in the preprocessed program code 600. In contrast the absence of the macro-preprocessor declaration 615 results in the inclusion of object module $M_2$ 645 and generation of a thin version 655.

Figure 7:
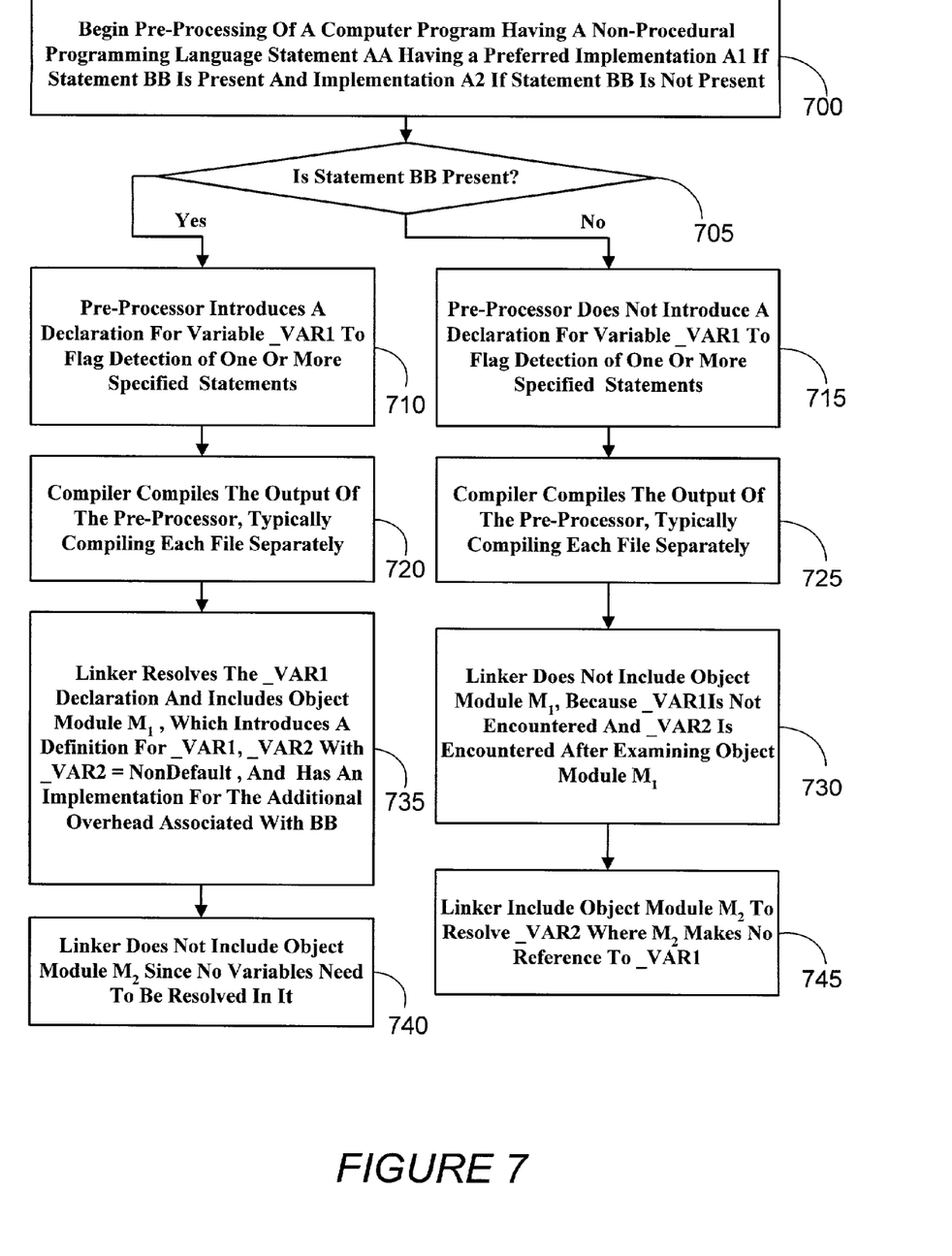
FIG. 7 is a flow diagram illustrating the different implementations for a second statement due to the occurrence or non-occurrence of a first statement in a computer program in accordance with an embodiment of the invention.

FIG. 7 is a flowchart that tracks the implementation of a statement AA in a computer program in accordance with the invention. Statement AA has at least two possible code implementations that are suited to contexts defined by the presence or absence of another statement BB. If statement BB is present then implementation code A1 is preferred while the absence of statement BB results in implementation A2 being preferred. The preprocessing of the computer program begins at step 700. During step 705 the macro-preprocessor examines source code to detect the presence of statement BB. If statement BB is present then the pre-processor introduces a declaration for a variable _VAR1 during step 710. On the other hand, a failure to detect statement BB results in no such declaration being introduced during step 715. The compiler compiles the pre-processor output during steps 720 and 725 following steps 710 and 715 respectively.

Following compilation, the linker does not locate a definition of _VAR1 because it does not occur elsewhere in the computer program. Consequently, during step 730, which follows step 725, the linker does not include the first object module $M_1$. Object module $M_1$ has a definition for _VAR1 and a declaration and definition setting another variable _VAR2 to a non-default value where _VAR2 is found in object modules in the linker libraries but not in the computer program. On the other hand, introduction of _VAR1 by the macro-preprocessor results in the inclusion of object module $M_1$ by the linker during step 735, which follows step 720, since the linker encounters the object module $M_1$ prior to the object module $M_2$. Note that object module $M_2$ is the last object module in each linker library used by the linker and introduces a default value, such as 0 for _VAR2.

Following inclusion of object module $M_1$ the linker does not include object module $M_2$. In contrast, since object module $M_2$ includes a definition of _VAR2, it is included if object module $M_1$ is not included to resolve references to _VAR2 in other object modules. Thus, the inclusion of $M_1$ and $M_2$ by the linker is on a mutually exclusive basis. $M_1$ provides access to code supporting added functionality required by the statement AA if statement BB occurs in the computer program. $M_2$, on the other hand, has no such functionality.

In an embodiment of the invention, an application uses a global variable to alter its behavior based on the use or non-use of a feature. Because the detection of the value of the global variable's value occurs at run-time, the code supporting both cases is linked into the application as illustrated below:

```
if (_FEATURE_XYZ_USED) {/* Or, if(!_FEATURE_XYZ_NOT_USED) */
do_thing_the_XYZ_way( );
    } else {    /* feature XYZ not used */
        do_thing_the_other_way( );
    }
```

The application is not linked against either library. Instead, statically linked wrappers with those function names are provided. These wrappers explicitly load the correct library and obtain the address of the requested function within that library. Thereafter, they merely forward all calls to the dynamically loaded function.

In order to produce an executable, the linker must include both do_thing_the_XYZ_way( ) and do_thing_the_other_way( ). In order to reduce the runtime footprint the implementations of do_thing_the_XYZ_way( ) and do_thing_the_other_way( ) are placed in separately named dynamically loaded libraries. The program itself makes calls to do_thing_the_XYZ_way( ) with that entry-point resolved at link-time from a library containing the wrapper described immediately above. The first time the wrapper is invoked at run-time, the wrapper loads the appropriate dynamically loaded library, finds and stores the entry-point of the same-name function within that library, and invoked that entry-point. At subsequent invocations of the wrapper, the stored entry-point is used immediately with no additional overhead.

In an exemplary embodiment of the invention, given that a stub routine do_thing( ) is statically linked into the executable, a dynamically-linked version of the code is as follows:

```
int first_call = 0;
    . . .
    if( first_call) {
        first_call = 1;
        proper_routine = choose_thing( );
    }
    proper_routine( );
    . . .
where choose_thing( ) consists of the following code:
    choose_thing( ) {
        if(_FEATURE_XYZ_USED) {
            open_dynamic_library(XYZ);
            return pointer to do_thing_the_XYZ_way( );
```

```
        } else {
            open_dynamic_library(not_XYZ);
            return point to do_thing_the_other_way( );
        }
```

In other words, in the first instance where invoking either do_thing_the_XYZ_way( ) or do_thing_the_other_way( ) results in the actual call being to the general choose_thing( ) function. In turn, choose_thing( ) checks the _FEATURE_XYZ_USED flag, opens the appropriate version of the dynamic library and loads the correct version of the routine. The choose_thing( ) routine returns the correct version, that overloads some other name, such as proper_routine( ). Then, upon calling the proper_routine( ) results in aliasing it to the correct version of the routine from the correct library.

In an alternative exemplary embodiment of the invention, very early in the executable program, the following code is executed:

```
main( ) {
    ...
    if(_FEATURE_XYZ_USED ) {
        load_dl(do_XYZ_things);
    } else {
        load_dl(do_other_things);
    }
``` where load_d1( ) opens and loads a dynamic library. In this case, both the dynamically-loadable libraries do_XYZ_things and do_other_things contain the same entry points, except that in the first case they are written to use feature XYZ. After the appropriate dynamic library is loaded, the correct versions of the routines are used on subsequent calls.

In another embodiment of the invention, the wrapper includes a check on the global variable's state and reports an error if the application attempts to call the function in the wrong state. For instance, the do_thing_the_XYZ_way( ) would report an error if it found _FEATURE_XYZ_USED was false.

By avoiding the implicit link to both versions of the do_thing functionality (in separate libraries), "snapping" the links to the library with known entrypoints that are not going to be used based on link-time recognition is avoided with a reduction in the start-up overhead and memory consumption.

"Snapping" the links refers to run-time resolution of entry-points left unresolved at load-time. Entry-points flagged at load-time for resolution at run-time are stored in a special area of the program image file. When the program image file is loaded into memory at run-time, the entry-point linkages in this special area are filled with the correct addresses of the actual function entry-points in the dynamically loaded library containing the entry point linkages. This differs from load-time linking, where the address of the actual function is known at load-time. The operating system's program loader handles the "snapping" of links responsible for loading a program image into memory for execution.

Another embodiment indirectly calls the wrapper function through a function pointer-table entry. After the wrapper dynamically loads the appropriate library, it changes the function pointer-table entry to point directly to the matching function in the loaded library. The wrapper appears in a statically-linked library (i.e. its address is resolved at load-time). Following initialization of the above-described table, an entry "n" contains the address of the wrapper. If a program built in accordance with this embodiment wants to perform do_thing( ), then rather than directly invoking an entry-point (that is resolved at load time or snapped from some dynamic library at run time), the program invokes the function pointed to by entry "n" of the table. The first time this invocation occurs, the entry is pointing at the wrapper described above. This wrapper replaces the entry with a pointer to the correct function (i.e. the one indicated by the value of _FEATURE_XYZ_USED) and then calls that function. On subsequent invocations (invocation via entry "n" in the table), the correct function is called directly and without invoking the wrapper.

A "helper" function appears in the statically-linked library. This helper performs the functions of the aforementioned wrapper function for every entry in the table. The helper function checks the appropriate _FEATURE_xxxx_USED variables, loads the matching library, finds the matching function name, and places the address of that entry-point into the appropriate table entry. If a program built in accordance with this embodiment wants to perform do_thing( ), then rather than directly invoking an entry-point (that is resolved at load-time or snapped from some dynamic library at run time), the program invokes the function pointed to by entry "n" of the table. The first time any function available through this table is invoked (say, entry "i"), the entry is pointing at the wrapper described above. The wrapper invoked helper function replaces each entry in the table with a pointer to the correct function. The wrapper then calls the function via entry "i." On subsequent invocations (invocation via any entry "j" in the table), the correct function is called directly without the need to invoke the wrapper.

The preceding description illustrates the selection of different object modules by the linker to allow the same command to use two different implementations in a manner responsive to the program code environment. The invention is not limited to the embodiment described above or to the proposed implementation of the SAVEPOINT command. Other commands of interest can be similarly handled. The earlier illustrations of other ways for the macro-preprocessor to introduce statements are also easily adapted to result in the context-sensitive exclusion or inclusion of a particular object module.

Moreover, implementations of the invention include computer-readable medium having computer executable instructions for performing the steps of a method for constructing a computer program developed. The computer-readable medium has computer executable instructions for performing the step of declaring the first variable in the first source file by insertion of a first variable declaration statement by a macro-preprocessor responsive to the detection of the first statement of the non-procedural programming language.

Figure 8:
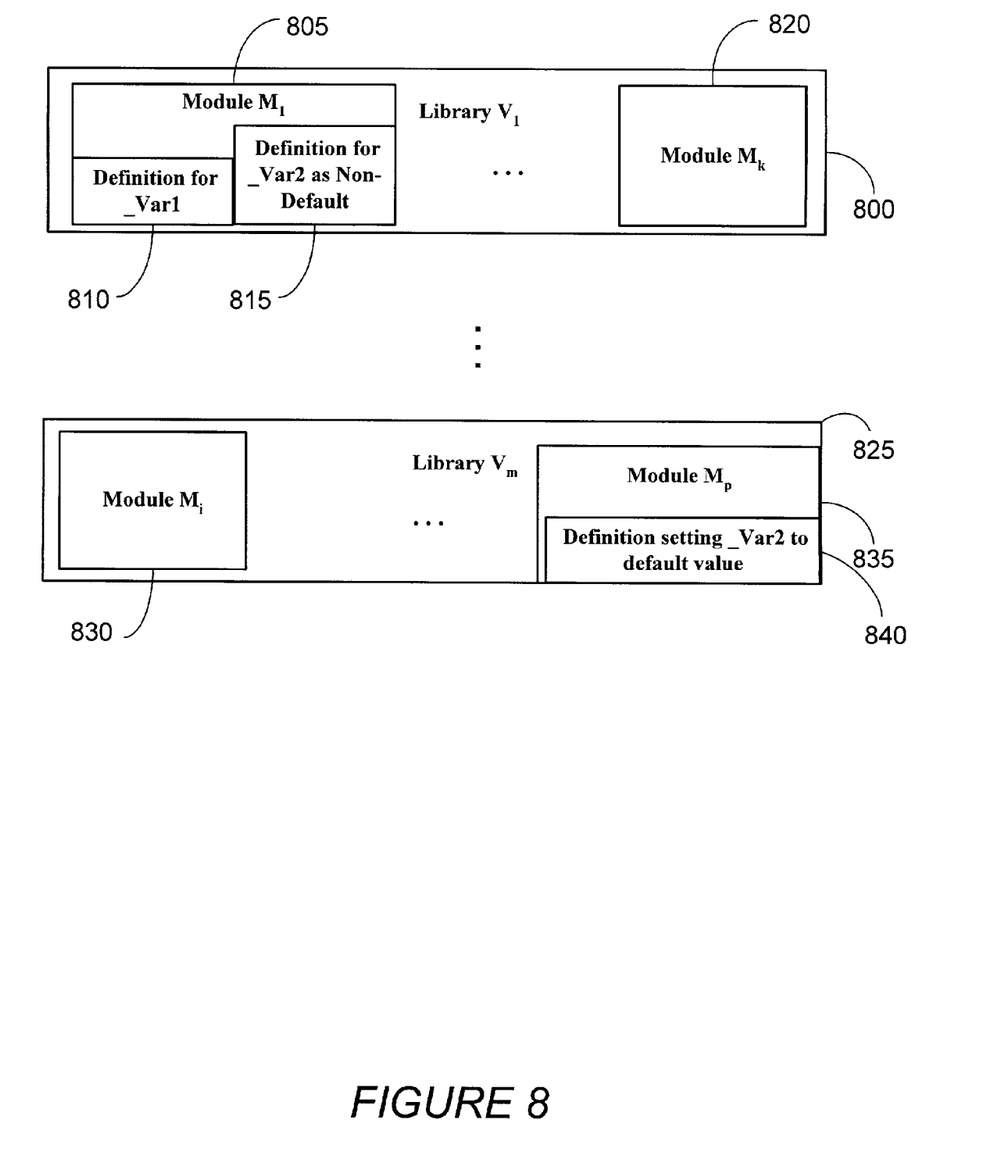
FIG. 8 illustrates exemplary linker libraries.

The design of suitable linker libraries is modified in accordance with the invention. FIG. 8 illustrates an embodiment of linker libraries with object modules and libraries corresponding to the order in which the libraries are used to resolve references. Naturally, first the unresolved references in the source program code are resolved followed by references that need to be resolved due to object modules so included. In FIG. 8 a first linker library $V_1$ 800 has a first object module $M_1$ 805 and a second object module $M_k$ 820. The first object module $M_1$ 805 has a definition for _VAR1 810 and another variable _VAR2 with a non-default value 815. The definition for _VAR2 implicitly introduces a declaration because memory allocation requires knowledge of the type for the variable. Another linker library $V_m$ 825 has object modules $M_i$ 830. In particular, linker library $V_m$ 825 has an object module $M_p$ 835 having a definition 840 setting _VAR2 to a default value.

Typically, the linker encounters the object module $M_1$ 805 earlier than any other object module, particularly object module $M_p$ 840. Advantageously, object module $M_p$ 840 is implemented as the last object module in a linker library to ensure the correct order of processing.

In view of the many possible embodiments to which the principles of this invention may be applied, it should be recognized that the embodiments described herein with respect to the drawing FIG.s is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method comprising:
    examining, by a computing device, a program code that includes at least procedural programming language statements;
    detecting, by the computing device, a first non-procedural programming language statement in the program code, the first non-procedural programming language statement having multiple implementations one of which is selected based on a presence or absence of a second non-procedural language statement in the program code;
    in response to detecting the first non-procedural programming language statement, determining, by the computing device, if the program code includes the second non-procedural programming language statement defining a context specific implementation of the first non-procedural programming language statement;
    in response to determining that the program code includes the second non-procedural programming language statement, introducing into the program code, by the computing device, a declaration for an undefined variable to flag the presence of the second non-procedural programming language statement, the undefined variable being declared using an extern keyword;
    inserting, by the computing device, function calls compliant with an Open Database Connectivity (ODBC) standard;
    compiling, by the computing device, the program code;
    at link-time, selecting, by the computing device, one of a plurality of alternative object modules based on whether the compiled program code includes the undefined variable, a first of the alternative object modules providing a definition of the undefined variable and the context specific implementation of the first non-procedural programming language statement being selected if the compiled program code includes the undefined variable, and a second of the alternative object modules providing a second implementation of the first non-procedural programming language statement being selected if the compiled program code does not include the undefined variable; and
    building, by the computing device, an executable program corresponding to the program code by linking-in the selected alternative object module.

2. The method of claim 1, wherein the non-procedural programming language statements are embedded SQL (ESQL) statements.

3. The method of claim 1, wherein the examining, detecting, determining, introducing, and inserting are performed by a macro-preprocessor of the computing device.

4. The method of claim 1, wherein the plurality of alternative object modules are stored in a linker library.

5. The method of claim 1, wherein the second alternative object module includes a second undefined variable.

6. The method of claim 5, further comprising additionally selecting a third alternative object module that provides a definition for the second undefined variable.

7. A computer-readable storage medium containing computer-executable instructions performing a method for creating a computer-executable program from program code, the method comprising:
    examining the program code that includes at least procedural programming language statements;
    detecting a first non-procedural programming language statement in the program code, the first non-procedural programming language statement having multiple implementations one of which is selected based on a presence or absence of a second non-procedural language statement in the program code;
    in response to detecting the first non-procedural programming language statement, determining if the program code includes the second non-procedural programming language statement defining a context specific implementation of the first non-procedural programming language statement;
    in response to determining that the program code includes the second non-procedural programming language statement, introducing into the program code a declaration for an undefined variable to flag the presence of the second non-procedural programming language statement, the undefined variable being declared using an extern keyword;
    inserting function calls compliant with an Open Database Connectivity (ODBC) standard;
    compiling the program code;
    at link-time, selecting one of a plurality of alternative object modules based on whether the compiled program code includes the undefined variable, a first of the alternative object modules providing a definition of the undefined variable and the context specific implementation of the first non-procedural programming language statement being selected if the compiled program code includes the undefined variable, and a second of the alternative object modules providing a second implementation of the first non-procedural programming language statement being selected if the compiled program code does not include the undefined variable; and
    building the computer-executable program by linking-in the selected alternative object module.

8. The computer-readable storage medium of claim 7, wherein the non-procedural programming language statements are embedded SQL (ESQL) statements.

9. The computer-readable storage medium of claim 7, wherein the computer executable instructions performing the steps of examining, detecting, determining, introducing, and inserting are executed by a macro-preprocessor computing device.

10. The computer-readable storage medium of claim 7, wherein the plurality of alternative object modules are stored in a linker library.

11. The computer-readable storage medium of claim 7, wherein the second alternative object module includes a second undefined variable.

12. The computer-readable storage medium of claim 11, further comprising additionally selecting a third alternative object module that provides a definition for the second undefined variable.

13. A system comprising:
a processor;
a storage medium coupled to the processor and storing a linker library of a plurality of alternative object modules; and
computer-executable instructions performing operations creating a computer-executable program from program code, the operations including:
examining the program code that includes at least procedural programming language statements;
detecting a first non-procedural programming language statement in the program code, the first non-procedural programming language statement having multiple implementations one of which is selected based on a presence or absence of a second non-procedural language statement in the program code;
in response to detecting the first non-procedural programming language statement, determining if the program code includes the second non-procedural programming language statement defining a context specific implementation of the first non-procedural programming language statement;
in response to determining that the program code includes the second non-procedural programming language statement, introducing into the program code a declaration for an undefined variable to flag the presence of the second non-procedural programming language statement, the undefined variable being declared using an extern keyword;
inserting function calls compliant with an Open Database Connectivity (ODBC) standard;
compiling the program code;
at link-time, selecting one of the plurality of alternative object modules of the linker library based on whether the compiled program code includes the undefined variable, wherein a first of the alternative object modules providing a definition of the undefined variable and the context specific implementation of the first non-procedural programming language statement is selected if the compiled program code includes the undefined variable, and a second of the alternative object modules providing a second implementation of the first non-procedural programming language statement is selected if the compiled program code does not include the undefined variable; and
building the executable program by linking-in the selected alternative object module.

14. The system of claim 13, wherein the computer-executable program is suitable for accessing, managing, and/or utilizing a database.

15. The system of claim 13, further comprising a macro-preprocessor to execute the instructions performing the operations of examining, detecting, determining, introducing, and inserting.

16. The system of claim 13, wherein the non-procedural programming language statements are embedded SQL (ESQL) statements.

* * * * *